(12) United States Patent
Qureshi (10) Patent No.: US 8,206,528 B2
(45) Date of Patent: *Jun. 26, 2012

(54) METHOD OF APPLYING A FILM TO AN ENDLESS MOVING HANDRAIL HAVING A LAYER WITH A BARRIER COATING

(75) Inventor: Naseer Mohammed Qureshi, Oshawa (CA)

(73) Assignee: EHC Canada, Inc., Oshawa (CA)

( * ) Notice: Subject to any disclaimer, the term of this patent is extended or adjusted under 35 U.S.C. 154(b) by 109 days.

This patent is subject to a terminal disclaimer.

(21) Appl. No.: 12/267,128

(22) Filed: Nov. 7, 2008

(65) Prior Publication Data

US 2009/0126858 A1 May 21, 2009

Related U.S. Application Data

(60) Provisional application No. 60/986,868, filed on Nov. 9, 2007.

(51) Int. Cl.
*B32B 33/00* (2006.01)
*B29C 65/00* (2006.01)
*B66B 23/24* (2006.01)

(52) U.S. Cl. ............ 156/90; 156/71; 156/182; 156/277; 156/289; 198/335; 198/336; 198/337; 198/338

(58) Field of Classification Search ............ 156/71, 156/90, 182, 277, 289; 198/335–338
See application file for complete search history.

(56) References Cited

U.S. PATENT DOCUMENTS

| | | |
|---|---|---|
| 3,055,496 A | 9/1962 | Dunlap |
| 4,246,307 A | 1/1981 | Trautwein |
| 4,285,752 A | 8/1981 | Higgins |
| 4,421,816 A | 12/1983 | Arnold |
| 4,469,729 A * | 9/1984 | Watanabe et al. ............ 428/36.2 |
| 4,517,044 A | 5/1985 | Arnold |
| 4,586,971 A | 5/1986 | Wallace, Jr. |
| 4,597,992 A | 7/1986 | Kawashima |
| 5,020,256 A | 6/1991 | French |
| 5,160,009 A | 11/1992 | Lyoda et al. |

(Continued)

FOREIGN PATENT DOCUMENTS

CN 2679120 Y 2/2005

(Continued)

OTHER PUBLICATIONS

Harris A. Goldberg and Carrie A. Feeney, CBD SBIR Phase 1 Final Report: Improved Chemical Protective Gloves Using Elastomeric Nanocomposites, InMat LLC, Report No. InMat 2002-103, Nov. 14, 2002.

(Continued)

*Primary Examiner* — Katarzyna I. Wyrozebsky
*Assistant Examiner* — Carson Gross
(74) *Attorney, Agent, or Firm* — Bereskin & Parr LLP/S.E.N.C.R.L., s.r.l.

(57) ABSTRACT

A method of applying a film to an endless moving handrail comprises the steps of adhering a first film layer, having sufficient resilience to accommodate strains occurring on the surfaces of the endless moving handrail and including a barrier coating on at least one of top and bottom surfaces of the first layer, to a top surface of an endless moving handrail, and adhering a substantially transparent film layer over the first film layer.

23 Claims, 7 Drawing Sheets

U.S. PATENT DOCUMENTS

| | | | |
|---|---|---|---|
| 5,275,270 | A | 1/1994 | Dobo |
| 5,403,636 | A | 4/1995 | Crum |
| 5,891,294 | A | 4/1999 | Shih et al. |
| 5,894,048 | A | 4/1999 | Eckart et al. |
| 6,047,809 | A | 4/2000 | Idetsuki |
| 6,082,525 | A | 7/2000 | Vonholm et al. |
| 6,087,016 | A | 7/2000 | Feeney et al. |
| 6,110,546 | A | 8/2000 | Honda et al. |
| 6,232,389 | B1 | 5/2001 | Feeney et al. |
| 6,450,228 | B1 | 9/2002 | McLeod et al. |
| 6,564,921 | B1 | 5/2003 | Gorczyca |
| 6,653,386 | B2 | 11/2003 | Graf et al. |
| 6,682,806 | B1 | 1/2004 | McLeod et al. |
| 6,831,127 | B2 | 12/2004 | Fujiki et al. |
| 7,026,028 | B2 | 4/2006 | Gijsman et al. |
| 7,041,195 | B2 | 5/2006 | McLeod et al. |
| 7,078,453 | B1 | 7/2006 | Feeney et al. |
| 7,108,905 | B2 | 9/2006 | McLeod |
| 7,119,138 | B1 | 10/2006 | Feeney et al. |
| 7,278,528 | B2 | 10/2007 | McLeod et al. |
| 2002/0172806 | A1 | 1/2002 | McLeod et al. |
| 2004/0103572 | A1 | 6/2004 | Naidu |
| 2004/0247843 | A1 | 12/2004 | McLeod et al. |
| 2005/0118400 | A1 | 6/2005 | McLeod et al. |
| 2006/0046027 | A1* | 3/2006 | Kaminski et al. ............ 428/143 |
| 2006/0235128 | A1 | 10/2006 | Wang et al. |
| 2007/0284031 | A1 | 12/2007 | McLeod et al. |
| 2009/0163663 | A1 | 6/2009 | Qureshi |

FOREIGN PATENT DOCUMENTS

| | | |
|---|---|---|
| CN | 2419191 Y | 2/2007 |
| CN | 2887819 Y | 4/2007 |
| DE | 29811446 | 11/1998 |
| FR | 2728377 | 6/1996 |
| FR | 2610751 | 8/1998 |
| GB | 2044673 | 10/1980 |
| GB | 2293478 | 3/1996 |
| IT | 660506 | 4/1968 |
| JP | 48-25687 | 3/1973 |
| JP | 54-155595 | 12/1979 |
| JP | 57-130883 | 8/1982 |
| JP | 59-17480 | 1/1984 |
| JP | 61-5883 | 1/1986 |
| JP | 62-33080 | 2/1987 |
| JP | 62-35834 | 2/1987 |
| JP | 2-41932 | 3/1990 |
| JP | 3-76463 | 4/1991 |
| JP | 3-86383 | 8/1991 |
| JP | 03-223089 | 10/1991 |
| JP | 3-272994 | 12/1991 |
| JP | 5-46857 | 6/1993 |
| JP | 5-306087 | 11/1993 |
| JP | 6-166154 | 6/1994 |
| JP | 6-206684 | 7/1994 |
| JP | 7-101659 | 4/1995 |
| JP | 7-125961 | 5/1995 |
| JP | 7-206352 | 8/1995 |
| JP | 07-311546 | 11/1995 |
| JP | 7-330271 | 12/1995 |
| JP | 8-199121 | 8/1996 |
| JP | 8-248883 | 9/1996 |
| JP | 8-286614 | 11/1996 |
| JP | 08-310780 | 11/1996 |
| JP | 10-081478 | 3/1998 |
| JP | 10-147489 | 6/1998 |
| JP | 02-286328 | 8/1998 |
| JP | 10-305487 | 11/1998 |
| JP | 11-005924 | 1/1999 |
| JP | 2000-021201 | 1/2000 |
| JP | 2000-502963 | 3/2000 |
| JP | 2000-103585 | 4/2000 |
| JP | 2004-529047 | 2/2001 |
| JP | 2001-302160 | 10/2001 |
| JP | 2003-212468 | 7/2003 |
| JP | 2003-252561 | 9/2003 |
| JP | 2003-276975 | 10/2003 |
| JP | 2004-331288 | * 11/2004 |
| JP | 2004331288 A | * 11/2004 |
| JP | 2005-015083 | 1/2005 |
| JP | 2005-103821 | 4/2005 |
| JP | 2006-062876 | 3/2006 |
| JP | 2006-089215 | 4/2006 |
| JP | 2006-103959 | 4/2006 |
| JP | 2006-103960 | 4/2006 |
| JP | 2006-103961 | 4/2006 |
| KR | 10-20010070798 | 5/2003 |
| KR | 10-0406755 | 11/2003 |
| KR | 10-20030009929 | 8/2004 |
| KR | 10-2007-19997 | 5/2007 |
| WO | 90/00788 A1 | 1/1990 |
| WO | WO 99/55793 | 11/1999 |
| WO | WO 00/48935 | 8/2000 |
| WO | WO 02/32803 | 4/2002 |
| WO | WO 2004/006215 | 1/2004 |
| WO | WO 2004/067431 | 8/2004 |
| WO | WO 2007/058050 | 5/2007 |
| WO | WO 2007/065410 | 6/2007 |
| WO | WO 2007/081075 | 7/2007 |

OTHER PUBLICATIONS

Michael Barnard, The Print and Production Manual, 1998, pp. 18-19, Pira International, Surrey, United Kingdom.

Frank J. Romano, Delmar's Dictionary of Digital Printing & Publishing, 1997, p. 366, Delmar Publishers, Albany, New York.

Hugh Spiers, Introduction to Printing and Finishing, 1998, pp. 100-101, Pira International, Surrey, United Kingdom.

International Search Report and Written Opinion mailed Feb. 12, 2009 in respect of International Application No. PCT/CA2008/001960.

International Search Report and Written Opinion mailed Feb. 3, 2009 in respect of International Application No. PCT/CA2008/001974.

* cited by examiner

METHOD OF APPLYING A FILM TO AN ENDLESS MOVING HANDRAIL HAVING A LAYER WITH A BARRIER COATING

CROSS REFERENCE TO RELATED APPLICATIONS

This application claims priority to U.S. Provisional Patent Application Ser. No. 60/986,868, filed on Nov. 9, 2007, entitled "ADRAIL BARRIER FILM".

FIELD OF THE INVENTION

The present invention generally relates to elastic and resilient films which are applied to a surface of an endless handrail of an escalator or moving walkway, which can be used to display decorative, informational or other visual material, typically in the form of print applied to one of the layers of the film, that may be used to provide advertising. More particularly, the present invention relates to elastic and resilient films for application to a surface of an endless moving handrail, which substantially retard the transmission of materials blooming from the endless moving handrail and affect the appearance of the visual material in the film.

SUMMARY OF INVENTION

One embodiment of the present invention is an elastic and resilient film for application to an endless moving handrail including a first layer having a top surface and a bottom surface and having sufficient resilience to accommodate strains occurring on the surface of the endless moving handrail, the first layer having an adhesive on the bottom surface and a first barrier coating on the top surface, the first barrier coating having sufficient resilience to accommodate strains occurring on the surface of the endless moving handrail and substantially retarding the transmission of materials blooming from the endless moving handrail. The elastic and resilient film includes a second layer having a top surface and a bottom surface overlying the first layer, the second layer having sufficient resilience to accommodate strains occurring on the surface of the endless moving handrail, and further having second adhesive on the bottom surface of the second layer. The elastic and resilient film further includes a substantially transparent layer overlying the top surface of the second layer.

A further embodiment of the present invention is an elastic and resilient film for application to a surface of an endless moving handrail, the film includes a first layer having a top surface and a bottom surface and sufficient resilience to accommodate strains occurring on the surface of the endless moving handrail and a barrier coating formed on a bottom surface thereof having sufficient resilience to accommodate strains occurring on the surface of the endless moving handrail and substantially retarding the transmission of materials blooming from the endless moving handrail. The elastic and resilient film of this embodiment also includes a substantially transparent layer overlying the top surface of the first layer.

In one embodiment, the substantially transparent layer may include an adhesive on a bottom surface thereof that may be substantially transparent or have an opacity that promotes the clarity of print or reverse print formed on the first, second or substantially transparent layer. The substantially transparent layer may be tinted, yet render the print on the first or second layer or the reverse print on the substantially transparent layer visible. Alternatively, the adhesive may be opaque. The print or reverse print may be a pattern repeated at regular intervals along the length of the first or second or substantially transparent layer. The adhesives may be pressure sensitive adhesives.

The first layer and/or second layer may be an elastomeric film comprising Thermoplastic Polyurethane. The first and/or second layer may have a substantially solid color and be substantially opaque. There may be print on the top surface of the first or second layer. Alternatively there may be reverse print on the substantially transparent layer between the bottom surface of the substantially transparent layer and an adhesive.

In one embodiment a width dimension of the substantially transparent layer is the same as a width dimension of the first layer and/or second layers, or alternatively, the width dimension of the substantially transparent layer may be greater than a width dimension of the first layer and/or second layer.

The barrier coating may include a polymer having elastomeric properties and particles embedded therein providing the barrier coating with barrier properties to selected substances. The particles may include platelets having a high aspect ratio and arranged generally along the length of the elastic resilient film. The platelets may be formed of nanoclay and the polymer may be formed of butyl rubber, nitrile rubber, or a polyester resin. The barrier coating may be formed by a single application of barrier coating materials, or by two or more separate applications of barrier coating materials. There may also be a second barrier coating, the barrier second coating, having sufficient resilience to accommodate strains occurring on the surface of the endless moving handrail and in combination with said first barrier coating, substantially retarding the transmission of materials blooming from the endless moving handrail formed on the bottom surface of the first layer between the first layer and an adhesive.

The top and bottom surfaces of the first and/or second layers and/or the barrier coating may be treated with a surface activation treatment. The surface activation treatments may include print receptive coatings, primers, corona discharge, flame treatment, and/or chemical treatment.

The elastic and resilient film may be applied to an endless moving handrail where the film has a width dimension corresponding to the handrail, is elongate and has a length to fit the handrail or a width dimension enabling the elastic and resilient film to wrap at least partially around the handrail.

The elastic and resilient film has a thickness that does not substantially alter the dimensions of the handrail, and enables the handrail to be used with and without the film, and the adhesive may be selected to permit removal of the film. The endless moving handrail may be comprised of Styrene Butadiene Rubber, a combination of Styrene Butadiene and Natural Rubber, Chloro Sulfonated Polyethylene or Thermoplastic Polyurethane.

Another embodiment of the present invention is a method of applying a film to an endless moving handrail including the steps of adhering a first film layer, having sufficient resilience to accommodate strains occurring on the surfaces of the endless moving handrail and including a barrier coating on at least one of a top and bottom surfaces of the first layer, to a top surface of an endless moving handrail, and adhering a substantially transparent film layer over the first film layer.

The method may also include steps where the adhering of the substantially transparent film to first film occurs prior to the adhering of the first film to the handrail, or the adhering of the substantially transparent film to the first film may occur after the adhering of the first film to the handrail.

The barrier coating may be on the top surface of the first film layer and the method include a step of adhering a second film layer to a top surface of a barrier coating, the second layer having sufficient resilience to accommodate strains occurring on the surfaces of the endless moving handrail.

In one embodiment the second film layer and the substantially transparent film layer are adhered together first and subsequently adhered to the first film layer previously adhered to the endless moving handrail.

Alternatively the first film layer and second film layer may be adhered together to form a combination prior to adhering the combination to the endless moving handrail. The adhering of the substantially transparent film onto the second film layer may occur after the adherence of the combination to the handrail.

According to another embodiment the second film layer and the substantially transparent film layer with reverse print are adhered together first and subsequently adhered to the first film layer previously adhered to the endless moving handrail. Alternatively, the first film layer and second film layer are adhered together to form a combination prior to adhering the combination to the endless moving handrail. And the adhering of the substantially transparent film with reverse print onto the second film layer may occur after the adherence of the combination to the handrail.

Yet a further embodiment of the present invention is a method of manufacturing an elastic and resilient film to be applied to an endless moving handrail including steps of providing a first layer having sufficient resilience to accommodate strains occurring on the surfaces of the endless moving handrail, an adhesive on a bottom surface of the first layer, and a barrier coating on a top surface of the first layer, providing a second layer having sufficient resilience to accommodate strains occurring on the surfaces of the endless moving handrail and an adhesive on a bottom surface of the second layer, providing a substantially transparent layer having an adhesive on a bottom surface thereof, and laminating the first layer, second layer, and substantially transparent layer together.

In one embodiment print is applied to a top surface of the second layer prior to lamination and the handrail film is applied to an endless moving handrail. The second layer receives the print and is thereafter laminated together with the substantially transparent layer to protect the print. Alternatively, reverse print is applied to a bottom surface of the substantially transparent layer between the adhesive and the substantially transparent layer and applied to an endless moving handrail. Each of the three layers may be provided with a liner protecting the adhesives prior to lamination.

The lamination of the second layer and the substantially transparent layer may be performed by heat or pressure lamination. In one embodiment combined second and substantially transparent layers are laminated onto the first layer either by heat or pressure lamination. The first and second layers may laminated together prior to application of the print again either by heat or pressure lamination.

Alternatively, the substantially transparent layer with the reverse print is laminated onto the second layer either by heat or pressure lamination. Thereafter, the combined substantially transparent layer and second layer are laminated onto the first layer, again either by heat ore pressure lamination. Or prior to lamination of the substantially transparent layer on to the second layer the first and second layers may be laminated together by heat or pressure lamination.

In another embodiment prior to application of the print, the top surface of the second layer is surface treated to promote adhesion of the print thereto. Alternatively, prior to application of the reverse print to the bottom surface of the substantially transparent layer, the bottom surface is treated with a surface treatment to promote adhesion of the reverse print thereto.

In another embodiment the top surface of the first layer is treated with a surface treatment to promote adhesion of the barrier coating thereto. In addition, the first layer may be provided with a second barrier coating on the bottom surface between the first layer and the adhesive, and the bottom surface of the first layer is treated with a surface treatment to promote adhesion of the second barrier coating thereto.

Yet a further embodiment of the present invention is directed to a method of manufacturing an elastic and resilient film to be applied to an endless moving handrail including the steps of providing a first layer having sufficient resilience to accommodate strains occurring on the surfaces of the endless moving handrail, a barrier coating on a bottom surface of the first layer, and an adhesive on a bottom surface of the barrier coating, providing a substantially transparent layer having an adhesive on a bottom surface thereof, and laminating the first and substantially transparent layers together.

Print may be applied to a top surface of the first layer prior to lamination. Alternatively, reverse print may be applied to a bottom surface of the substantially transparent layer between the adhesive and the substantially transparent layer prior to lamination. The elastic and resilient film may be applied to an endless moving handrail In one embodiment, the first layer receives the print and is thereafter laminated together with the substantially transparent layer to protect the print this lamination may be a heat or pressure lamination process.

In one embodiment prior to application of the print, the top surface of the first layer is surface treated to promote adhesion of the print thereto. Alternatively, prior to application of the reverse print to the bottom surface of the substantially transparent layer, the bottom surface may be treated with a surface treatment to promote adhesion of the reverse print thereto. And the bottom surface of the first layer is treated with a surface treatment to promote adhesion of the barrier coating thereto.

Yet another embodiment of the present invention is directed to a method of applying a barrier coating to an elastic an resilient film, the method including steps of providing an elongate film having sufficient resilience to accommodate strains occurring on the surface of an endless moving handrail, the film being a continuous elongate strip, continuously applying a liquid barrier coating material as a solution comprising a solvent and solid material onto at least one surface of the film layer, controlling the liquid coating to provide a coating having a substantially uniform thickness, and promoting vaporization of the solvent, causing the barrier material to dry to leave the solids as a barrier having sufficient resilience to accommodate strains occurring on the surface of an endless moving handrail.

In one embodiment the step of controlling the liquid coating comprises controlling thickness of the coating by one of a post-metered or pre-metered process such as using a knife-over-roll technique to control the thickness of the coating.

The barrier coating material may be a polymer having elastomeric properties and particles embedded therein providing the barrier properties to selected substances. The particles may be platelets having a high aspect ratio and arranged generally along the length of the elastic resilient film. The polymer may be a butyl rubber, neoprene, nitrile rubber or a polyester resin and the particles may be nanoclay.

The barrier coating may be formed by a single application of barrier coating material or two or more separate applications of barrier coating materials. Prior to application of the second of the two applications of barrier coating materials, a first application of barrier coating materials may be surface treated.

In one embodiment there may also be a step of forming a second barrier coating, said barrier second barrier coating having sufficient resilience to accommodate strains occurring on the surface of the endless moving handrail, and where the second barrier coating is on a surface of the film opposite that which the first barrier coating is applied.

BRIEF DESCRIPTION OF THE DRAWINGS

The above and related objects, features and advantages of the present invention will be more fully understood by reference to the following, detailed description of the preferred, albeit illustrative, embodiments of the present invention when taken in conjunction with the accompanying figures, wherein.

DETAILED DESCRIPTION

The present invention generally relates to elastic and resilient films which are applied to a surface of an endless handrail of an escalator or moving walkway, and can be used to display decorative, informational or other material, typically in the form of print applied to one of the layers of the film. More particularly, the present invention relates to elastic and resilient films for application to a surface of an endless moving handrail, which substantially retard the transmission of materials blooming from the endless moving handrail to the film applied to the endless moving handrail. To retard the transmission of these materials blooming from the handrails the present invention utilizes one or more barrier coatings.

In the context of the present invention, the assignee of the present invention has developed films which are applied to handrails of escalator or moving walkways. Examples of uses of such films are described in earlier patents also assigned to the assignee of the present invention, such as for example, U.S. Pat. Nos. 6,450,228, 6,682,806, 7,041,195 7,108,905, and 7,278,528, the contents of which are hereby incorporated by reference. The purpose of such films may be either to enhance the appearance of the handrail or to display advertising and other information. Such a film, it is believed, has potential use in a number of applications. For example, it is believed that it may be desirable in high traffic areas such as airports, shopping malls, subway stations etc. Such films may be used to rent advertising space on the surface of the endless moving handrail.

Figure 1:
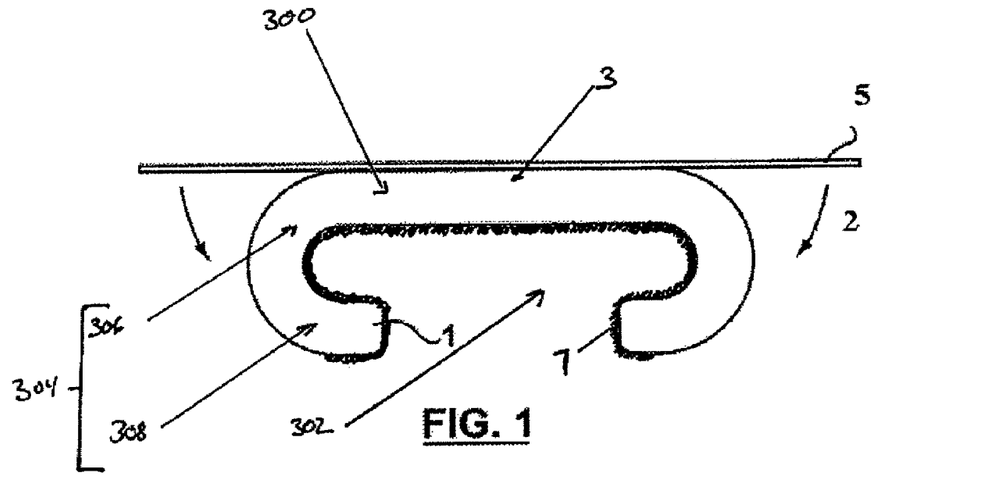
FIG. 1 show a schematic cross-section through a handrail and the application of a film to the top surface of the handrail in accordance with an embodiment of the present invention.

FIG. 1 shows, in outline, a schematic drawing of a typical handrail 1 to which a film 5 may be applied in accordance with an embodiment of the present invention. The arrows 2 indicate that the film 5 may be first applied to the top surface of the handrail 1 and may then be wrapped progressively around the handrail 1. An apparatus such as that disclosed in the patents mentioned above may be used to apply the film 5 to the handrail 1. Other known or hereafter developed techniques may be used to apply films of the present invention to handrails in accordance with the present invention.

Figure 2:
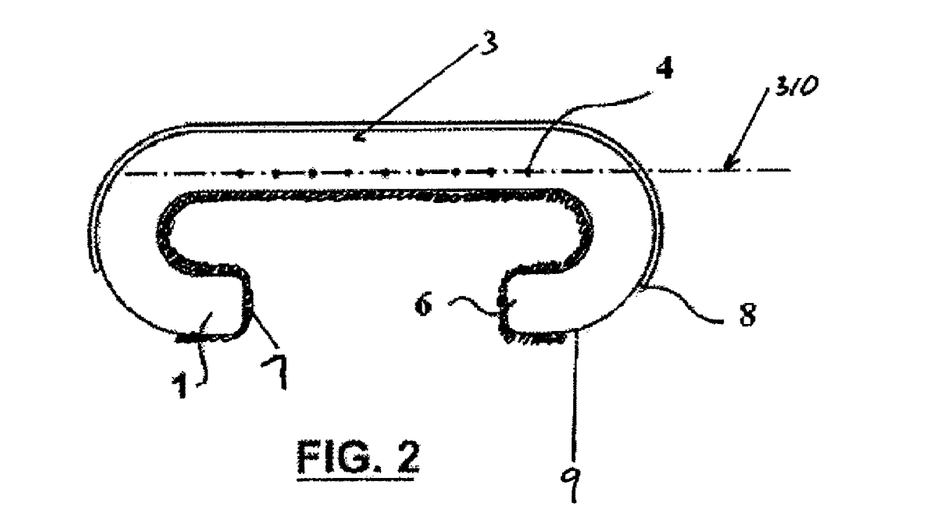
FIG. 2 shows a schematic cross-section similar to FIG. 1 showing the handrail after application of the film in accordance with an embodiment of the present invention.

FIG. 2 shows a schematic drawing of a handrail 1 after application of a film 5, in accordance with an embodiment of the present invention. FIG. 2 also shows elongate wires or stretch inhibitors 4 that may be embedded within the handrail 1, in a known manner, to provide the handrail with the desired characteristics, in accordance with an embodiment of the present invention. While not required by the present invention, these stretch inhibitors 4 may be used to define a neutral axis 310 about which the handrail flexes. Thus, portions of the film 5 above and below the neutral axis 310 of the wires or stretch inhibitors 4, in use, may be subject to tensile and compressive strains when the handrail is flexed in either direction.

The handrail 1 has a body 300, that may be formed of a variety of materials, as detailed below. The body 300 of handrail 1 defines a T-shaped slot 302. The wires or stretch inhibitors 4 are embedded in the body 300 and may be bonded to the material of the body. The handrail 1 may have shoulders 304 that are generally semi-circular and extend from the top of the handrail around to the underside of the handrail. The shoulders 304 include an upper portion 306 extending through about 90 degrees, starting at a substantially flat portion 3, and an lower portion 308 also extending through about 90 degrees. The upper portion 306 and the lower portion 308 may be separated by a plane that extends through the widest portion of the handrail 1.

At the end of the lower portion 308 there may be a short lip 6. The lips 6, together, have upper surfaces defining the underside of the top section of the T-shaped slot 302. The lips 6 may also have end surfaces facing one another and bottom surfaces, that are, in effect continuations of the outers surfaces of the lower portion 308 of the shoulder 304.

As indicated at 8, film 5 may wrap just a part way around the handrail 1. Alternatively, as indicated at 9, the film may wrap around to a point short of the end surfaces of the lips 6 of the handrail 1 and just before reaching a fabric slider 7, which may extend past the end surfaces of the lips 6.

One of skill in the art will appreciate that in practice the slider is generally embedded into the material of the handrail 1 in the vicinity of the lips 6, and particularly on bottom surface of the lips 6, which are part of the lower portion 308 of the shoulder 304. In FIGS. 1 and 2, the slider has been exaggerated to provide a better understanding of its location.

Extension of the film on to the fabric slider 7 is not desirable because the film will only poorly bond to the fabric slider 7 which can result in poor performance of the film. If the film 5 overlies portions of fabric slider 7, the edges of the film 5 in contact with the fabric slider may prematurely separate from the handrail 1, promoting failure of the film 5.

Depending upon a number of factors including the desired appearance, the intended life cycle of the film, and the construction of the film 5 and handrail 1, the extent to which the film 5 wraps around the handrail 1 can be varied. For example, the film 5 can extend to just to cover the substantially flat portion 3 of the handrail 5. Alternatively, the film 5 can extend to wrap completely around the upper portion 306 of the shoulder 304, that is to the widest part of the handrail 1; extend over the upper portion 306 of the shoulder 304 to the neutral axis 310; extend over the upper portion 306, past the neutral axis 310, to a point on the lower portion 308 equidistant from the neutral axis 310 as the substantially flat portion 3 is from the neutral axis 310; extend to cover at least part of the lower portion 308 of the shoulder 304, shown in FIG. 2 at 8; extend to a point 9 on the lower portion 308 that is just short of the where the slider 7 extends onto the lip 6.

It will be appreciated that the further the film 5 wraps around the handrail towards the lips 6, the greater the strain imposed on the film 5 when the handrail flexes. When the film 5 extends around pulleys or rollers while running as part of an escalator or moving walkway, the handrail 1 and portion of the film 5 beneath the neutral axis 310 tend to be put into compression. Such compressive strains tend to promote separation of the edges of the film 5 from the handrail 1, which can lead to puckering of those edges of the film 5.

In a further embodiment the various layers of the film 5 may wrap around the handrail 5 to different extents. Thus, by way of example, one layer may only extend across the substantially flat portion 3, while a second layer may extend to a point 8 or even to 9 just short of the slider 7 and lips 6. As will be described in greater detail below, in some embodiments of the present invention, a substantially transparent layer 10 (see, e.g., FIG. 3e), may extend to a point 8 or 9, while other layers 20, and 30 may have a smaller width dimension. This reduction in width dimension of layers 20 and/or 30 reduces the stress and strain in those layers as the endless moving handrail flexes. The extension of the substantially transparent layer to a point 8 (partially onto a lower portion 308 of the shoulder 304) or 9 (to a location just short of where the slider 7 is exposed on the lip 6) promotes adhesion of the entire film to the handrail and limits the likelihood of individuals picking at the layers and potentially damaging the film.

Handrails on escalators and moving walkways are typically made of a variety of materials, including Styrene Butadiene Rubber (SBR), a combination of Styrene Butadiene and Natural Rubber (SBR/NR), Chloro Sulfonated Polyethlene (CSM) or Thermoplastic Polyurethane (TPU), to name a few. One common problem associated with the use of advertising films on handrails made from SBR, for example, is that there are various chemicals that bloom onto the handrail's surface which can quickly discolor a decorative film applied thereto. Specifically, many types of rubbers, particularly SBR, incorporate protective materials that over the lifetime of the rubber migrate (bloom) to the surface. These materials act as a protectant for the underlying rubber and help to minimize the deleterious effects of, for example, UV light, ozone, etc. While in many applications these materials are beneficial to rubber, in the context of applying films with a decorative display, these materials blooming out of the handrail can ruin the decorative effect of the film and produce unsightly discoloration.

The present invention utilizes a barrier coating (or coatings), as described in greater detail below, applied to one or more layers of the handrail film. This barrier coating retards the progress of materials blooming out of the handrail by creating a tortuous path through which these materials have to pass in order to reach a subsequent layer of the film. This tortuous path effectively increases the amount of time required for these materials to bloom out of the handrail and reach another layer, adhesive, or the print and then affect the visual impact of the film applied to the handrail. At the same time, the layer, upon which the barrier coatings reside should maintain the overall elasticity of the handrail film.

The present invention is particularly directed to preventing the diffusion of materials that will react with either the materials of the films, the adhesives, or the print to visually affect the appearance of the film. Thus, complete prevention of diffusion of material through the barrier coating is not necessary, but rather the barrier coating can be optimized to prevent the diffusion of particular materials that adversely affect the visual impact of the film for a sufficient period of time to allow, for example, an advertisement to be placed for a desired time period.

In another aspect of the present invention, the barrier coating is optimized to prevent this diffusion of staining chemicals for a particular period of time. For example, an advertisement applied to a handrail may only be needed for a particular period of time, such as, for example, a one or two days, or a 1-week period for a convention, or alternatively it may be needed for a longer period such as a one, two or three month period during which a particular ad campaign is to be run. The barrier coating can be optimized to retard the diffusion of staining chemicals for a specific period of time.

One of the aspects of the invention is the use of these films as advertising platforms. It is believed that by optimizing the barrier coatings, a business or other owner of a moving handrail can generate recurring and scheduled revenue streams by permitting advertisement on such handrails and also control costs associated with providing that advertising. By tailoring the effectiveness of the barrier coating to the contracted time period, that is ensuring that the barrier coating will be effective for the entire advertising contract period, the business owner can save costs associated with having to remove and reapply an advertisement. Similarly, by tailoring the barrier coating to be effective for no more than the contract period, with proper safety margins, the costs associated with the manufacture of the advertisement itself can be minimized because an advertisement that will only be displayed for a week, does not necessarily require as thick a barrier coating material as one that is to run for a longer period of time such as one or two months. Thus by optimizing the barrier coating material application, the advertising revenue stream can be maximized.

In accordance with an embodiment of the present invention, a barrier coating may be formed by dissolving nano-clay in an elastomeric material. Such a nano-clay is available from InMat, Inc., and described in U.S. Pat. Nos. 6,087,016, 6,232, 389 and 7,078,453, for example, the contents of which are incorporated by reference. This material is supplied as a liquid form and is applied as a coating.

It has been found that nano-clays, dispersed in an elastomeric material, work well as a barrier. Examples of elastomeric materials include Neoprene, Nitrile rubber, Butyl rubber, and Polyester resin. A good dispersion of the nano-clay in the matrix is desired, and the nano-clay should not become clumped together; to the largest extent possible the laminar nano-clay particles should be oriented to be coplanar and in the plane of a film or layer, to enhance their collective barrier effect. It has been found that this product can give a considerably enhanced barrier property, even for a thin layer (e.g., 20 to 25 micrometers (μm) thick after coating/drying). The exact thickness for a particular application will depend on the properties of the materials blooming from the underlying handrail and the duration of time one wishes to retard the migration of these materials. Thus, one of ordinary skill in the art will appreciate that a greater of smaller thickness could be employed without departing from the scope of the instant invention.

Using these particles, one can enhance the barrier properties of the polymer. At the same time, since the material is based on a number of individual platelets that are not bonded to one another, the polymer retains its elastomeric characteristics.

In one embodiment of the present invention (see FIGS. 3a-3e), a flexible and resilient film comprising three layers is provided which can be applied to the surface of an endless moving handrail, and which resists the blooming of materials from the handrail which could otherwise damage images being displayed thereon.

In particular, this embodiment comprises a layer 30 upon which one or more barrier coatings may be applied, a layer 20 upon which print may be applied, and a substantially transparent layer 10 that protects the print. Layers 10, 20 and 30 are joined together to form a flexible and resilient film which may be applied to a handrail.

Figure 3A:
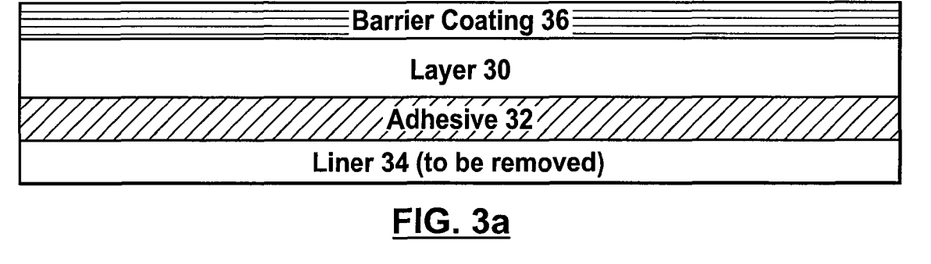
FIGS. 3a, 3b, 3c, 3d, 3e, 3f, and 3g show embodiments relating to a flexible and resilient film in accordance with the present invention comprising three layers.

FIG. 3a shows a layer 30 upon which the barrier coating is applied. Layer 30 is an elastomeric film having sufficient resilience to accommodate strains occurring on the surface of the endless moving handrail. Layer 30 may be comprised of Thermoplastic Polyurethane (TPU). Other materials including Thermoplastic Olefin (TPO), Thermoplastic Elastomers (TPE) such as those sold under the trade name Versaflex® Alloys, Thermoplastic Ionomer resins such as that sold under the trade name Surlyn®, metalized TPU, Thermoplastic Vulcanizate (TPV) such as that sold under the trade name Santoprene™, Polyvinylidene Fluoride (PVDF), and Thermoplastic Polyurethane/Polyolefin blends could also be used for layer 30. Among the Thermoplastic Polyurethane/Polyolefin blends are those disclosed in commonly assigned and co-pending U.S. patent application Ser. No. 11/972,864.

Layer 30 has a top surface and a bottom surface. Adhesive 32 may be applied to the bottom surface of layer 30. Adhesive 32 may be a pressure sensitive adhesive (PSA), or other adhesives as known and used in the art. Examples of appropriate adhesives include acrylic based PSAs, rubber based PSAs, and others. A removable release liner 34 may be applied to adhesive 32 to prevent the adhesive 32 and layer 30 from adhering to themselves or other objects when stored, such as in a rolled condition. Liner 34 may be comprised of paper, linen, polyester or other materials treated for use as a release liner as known in the art. The layer 30 may be between 1.0 and 5.0 mils in thickness and preferably between 1.0 and 3.0 mils. Further, the layer 30 may have a width of between 60 and 170 mm and preferably between 80 and 156 mm.

Figure 3B:
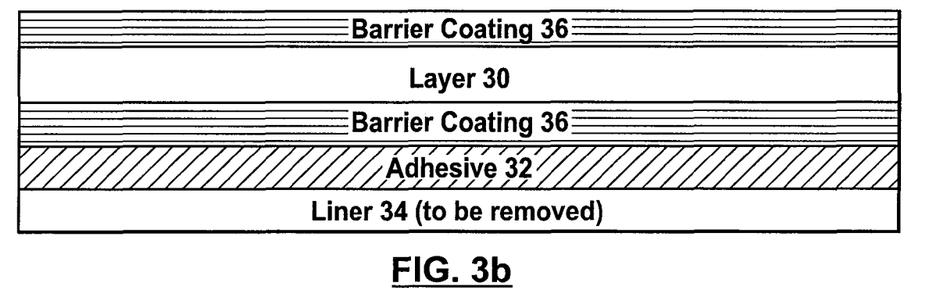

A barrier coating 36 is applied on at least one of the surfaces of layer 30. In one embodiment of the present invention the barrier coating 36 maybe applied as a single pass of, for example, between 6.0 and 12.0 mils (150-300 microns) when wet. However, the barrier coating could alternatively be applied in two or more passes, wherein each pass lays down a partial thickness of the barrier coating but resulting in a final barrier layer having the same or a similar thickness as a barrier coating applied in a single pass. It has been found that applying the barrier coating 36 using multiples passes (e.g., between 2 and 4 mils. (50-100 microns), each when wet), provides a film with improved barrier properties compared to a film with the barrier coating 36 applied in a single pass. In one preferred embodiment, the barrier coating may be, for example, between 3.0 and 16.0 mils (75-400 microns) when wet, resulting in a dry barrier coating of between 0.3 and 2.1 mils (7.5-52.5 microns), and preferably between 0.8 and 1.0 mils (20-25 microns) when dry depending upon the barrier properties needed for the application. The barrier coating can also be applied to both top and bottom surfaces of the layer 30, as shown in FIG. 3b.

Figure 3C:
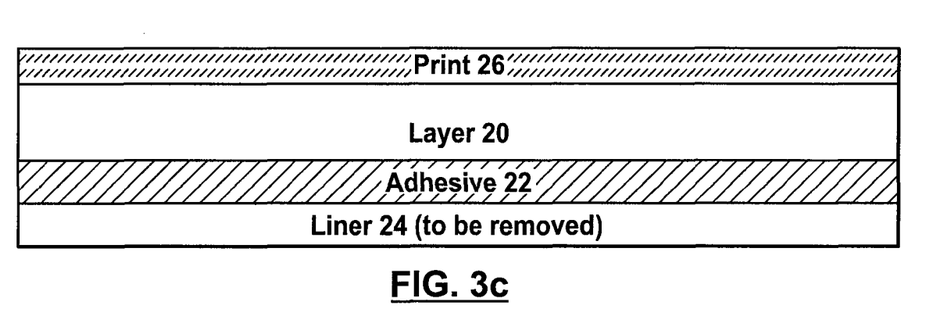

FIG. 3c shows a layer 20, having a top surface and a bottom surface. Layer 20 is preferably white, or another opaque color upon which print can be applied. Layer 20 may be comprised of TPU or other suitably elastomeric materials. Print 26 may be applied to the top surface of layer 20. Print may include words, images or other information that is desired to be displayed. Adhesive 22 may be applied to the bottom surface of layer 20. Examples of appropriate adhesives include PSAs and other adhesives as discussed above. The layer 20 may be between 1.0 and 5.0 mils (25-125 microns) in thickness and preferably between 1.0 and 3.0 mils (25-75 microns). Further, the layer 20 may have a width of between 60 and 170 mm and preferably between 80 and 156 mm. A removable liner 24 may be applied to the bottom surface of the adhesive 22 to prevent the adhesive 22 from causing the layer 20 to adhere to itself or other objects when stored, such as in a rolled condition. Liner 24 may be comprised of the materials discussed above with respect to liner 34

As used herein the term "print" is used to convey the application of an image, visual material and/or language, possibly repeated at regular intervals along the handrail, to convey a visual or written statement to a viewer. While it is contemplated that this print could indeed be ink such as commonly understood with the term print, the language should not be interpreted so narrowly and should include other methods of conveying such visual statement including, for example, photolithography, and others that might be used in advertising.

The print can be formatted in the film 5 so that in a central portion of the film, the portion that would cover the substantially flat portion 3 of the handrail 1 in FIG. 1, is aligned to present an apparent upright image to a viewer of the escalator or moving walkway. On the portions of the film 5 that cover the shoulder 304, the print can be configured to allow for the fact that these portions will generally be vertical. The print can be oriented on these shoulder portions so that it also appears vertical to the viewer, possibly requiring a different orientation during printing than those portions of the print that cover the substantially flat portion 3.

Figure 3D:
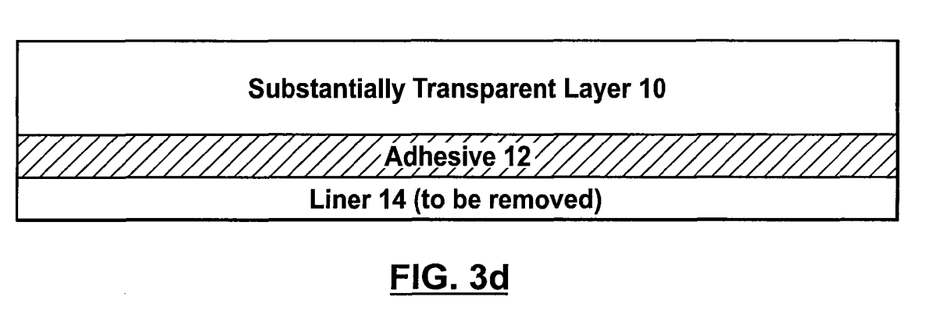

As shown in FIG. 3d, a substantially transparent layer 10 is also provided. This layer is applied on top of the layer 20 and acts as a protective coating for the other layers and particularly the print applied to the layer 20. The substantially transparent layer 10 is sufficiently resilient to accommodate strains occurring on the surface of the endless moving handrail. The substantially transparent layer may be comprised of TPU or other suitably elastomeric material as discussed above. The substantially transparent layer 10 may be between 1.0 and 5.0 mils in thickness and preferably between 1.0 and 3.0 mils. Further, the substantially transparent layer 10 may have a width of between 60 and 170 mm and preferably between 80 and 156 mm. The substantially transparent layer 10 includes an adhesive 12 on a bottom surface thereof. Examples of appropriate adhesives include PSAs and other adhesives as discussed above. A removable liner 14 may be applied to the bottom surface of the layer 10 to prevent the adhesive 12 from causing the layer 10 from adhering to itself or other objects when stored, such as in a rolled condition. Liner 14 may be comprised of the materials discussed above with respect to liner 34. The substantially transparent layer 10 may also be tinted.

In yet a further embodiment, where heat lamination is employed in the method of manufacture, the substantially transparent layer 10 does not include an adhesive 12. In such an embodiment, bonding of the substantially transparent layer 10 may be enabled through the heat lamination process itself which is well known in the art.

As used herein the term "lamination" refers to the process whereby multiple layers of film are joined to produce a multi-layer film. This term may include heat lamination, pressure lamination, and other means of joining layers to form the multi-layer film either with or without adhesives.

Figure 3E:
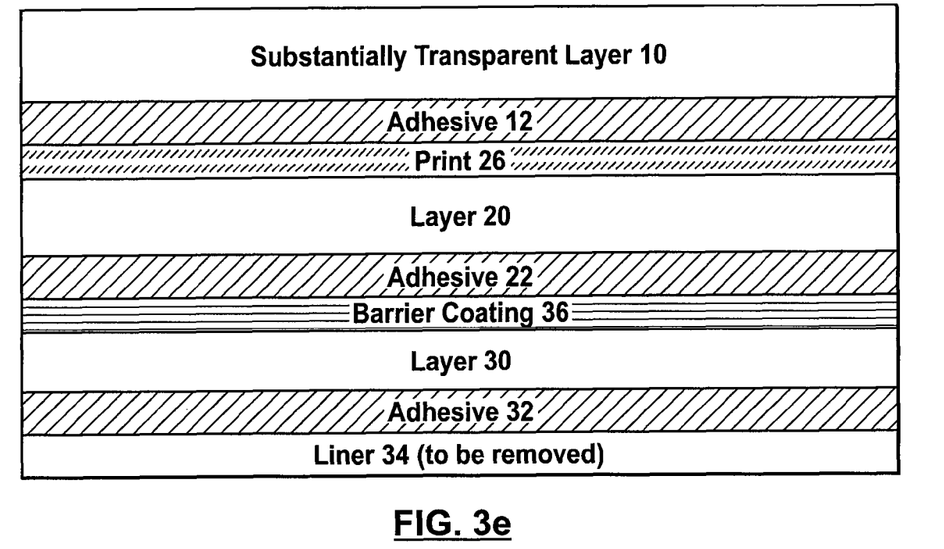

To form the elastic and resilient film of the present invention, these three layers 10, 20, and 30, described above, are laminated together to form a multi-layer film. Liners 14 and 24 applied to layers 10 and 20 are removed, and adhesive layers 12, 22 are bonded to layers 20 and 30, respectively, laminating all three layers together resulting in a three-layer film as shown in FIG. 3(e), which is ready to be applied to a handrail. In the preferred embodiment the layer 10 is laminated to layer 20 first covering and protecting the print 26. Subsequently the combined layers 10 and 20 are laminated to layer 30 which includes the barrier coating 36. Alternatively, prior to applying print 26 to layer 20, layers 20 and 30 could be laminated together. Subsequently, the print 26 can be applied to the top surface of layer 20 and layer 10 is laminated over the print 26. These steps result in a complete film ready for application to a handrail.

In another embodiment, one or more of the layers 10, 20 and 30 may be laminated to the other layers in the field as the film is being applied to the handrail. Thus for example, the layer 30 could be applied individually to the handrail, and thereafter substantially transparent layer 10 and layer 20 (either individually or commonly if they have been previously laminated together) can be applied to the top surface of layer 30. One of skill in the art will readily appreciate that other orders of lamination of two or more of the layers and the application of the print could be performed without departing from the scope of the instant invention.

Figure 3F:
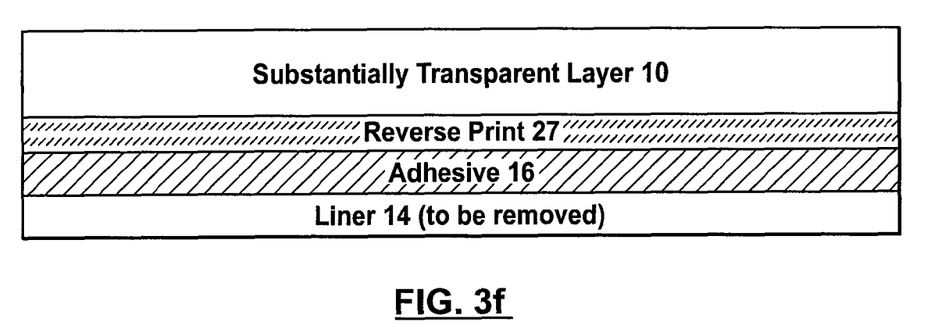

A further aspect of the present invention utilizes a reverse print 27, as shown in FIG. 3(f). According to this aspect of the invention rather than applying print 26 onto layer 20, the print is applied as reverse print 27 to an underside of the substantially transparent layer 10. Following application of the print 27, an adhesive 16 may be applied over the reverse print 27, which is used to laminate the substantially transparent layer 10, and reverse print 27 to layer 20. Reverse print, in this instance refers to the manner in which the print is applied to the substantially transparent layer 10. When applied and viewed from the side of the substantially transparent layer 10 on which the print is applied, the distinctive pattern will appear in reverse. As a result, when the substantially transparent layer 10 is turned over, as it would be when laminated together with the other layers for application to a handrail, the print appears normal (e.g., legible to the viewer).

In one embodiment of the present invention the adhesive 16 is prepared with a removable liner 14 already applied thereto. The adhesive 16 may be clear, tinted or opaque. The adhesive 16 and the substantially transparent layer 10 are then laminated together after the reverse print 27 is applied to the underside of the substantially transparent layer. The adhesive may be clear, opaque or tinted. Those of skill in the art will appreciate that other adhesives including adhesives not formed on a liner or requiring lamination to the substantially transparent layer may alternatively be used with this embodiment.

Such an embodiment lends itself to laminating with the other layers 20 and 30 in the field, that is at the handrail itself, because, the other layers 20 and 30 are not needed to protect the reverse print 27. Rather the reverse print 27 is protected by the adhesive 16 and/or a liner 114. Thus each of layers 10, 20 and 30 could be individually applied to the handrail. Alternatively, layers 20 and 30 can be laminated together prior to application to the handrail, and substantially transparent layer 10 with the reverse print can be applied to these layers after they have been applied to the handrail. Further, all three layers can be laminated together to form a complete film ready to be applied to a handrail in a single application step. Finally, rather than using an adhesive 16, the substantially transparent layer 10 with reverse print applied thereto, may be heat laminated to layer 20, either prior to or after joining layers 20 and 30 to each other.

In an alternative embodiment, the substantially transparent layer 10 may be comprised of a suitable coating, for example a UV-curable clear coating. For example, urethane acrylate formulations and other coatings known to those of skill in the art. In this embodiment, the UV-curable coating, once cured forms a substantially transparent layer 10, but does not necessarily require an adhesive 12 in FIG. 3d, to bond the substantially transparent layer to layer 20. Of course, if desired an adhesive or primer, for example, may be applied to improve bonding. In this embodiment, prior to application of the UV-curable coating print 26 is applied to layer 20. In one embodiment, after print 26 may be applied to layer 20, the UV-curable coating is applied. However, in an alternative embodiment the print 26 can be applied to the layer 20, and a second liner (not shown) can be employed which will protect the print during storage and transport until the UV-curable coating is applied. Once applied, the UV-curable coating is cured by exposure to a UV light source, and the UV-cured coating protects the print 26. It is preferred that the UV-curable coating is applied in a controlled setting such as a production facility as some UV curable coatings include hazardous materials and chemicals. But such a coating could also be applied in the field in some applications.

Figure 3G:
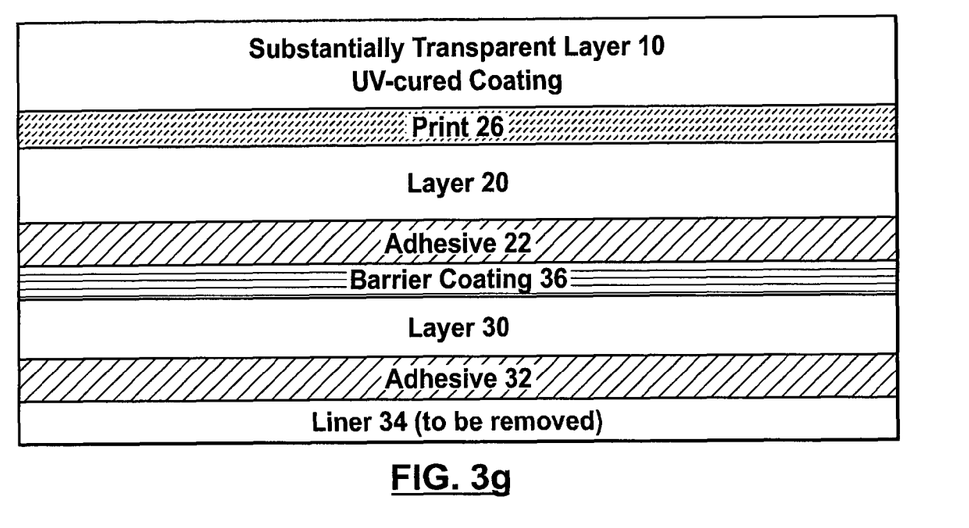

This embodiment may be completely or partially assembled prior to application of the film to a handrail. For example, in one embodiment, layers 20 and 30 may be combined after the print 26 and the UV-cured coating are applied to layer 20. Alternatively, layer 20 and 30 may be joined and thereafter print 26 and the UV-cured coating may be applied. In either event, the result is a film ready to be applied to a handrail. In addition, the joining of the layers may occur in the field as described above. In this alternative, layers 20 and 30 are either individually or jointly applied to the handrail. Where layer 20 already includes print 26 and the UV-cured coating forming substantially transparent film 10, the layers 20 and 30 are simply joined on the handrail to form a complete film. Alternatively, if layer 20 only has the print 26 applied, and the UV-curable coating is to be applied in the field, the liner covering the print 26 on layer 20 is removed, and the UV curable coating may be applied over the print and the top surface of layer 20. Thereafter a UV-light source may be used to cure the coating. The end result, whether formed as a complete film in a controlled environment or formed in the field appears in cross section as shown in FIG. 3g.

In another embodiment of the present invention (see FIGS. 4a-4f), a flexible and resilient film comprising two layers is provided which can be applied to the surface of an endless moving handrail, and which substantially retards the blooming of materials from the handrail which could otherwise damage images being displayed thereon.

Figure 4A:
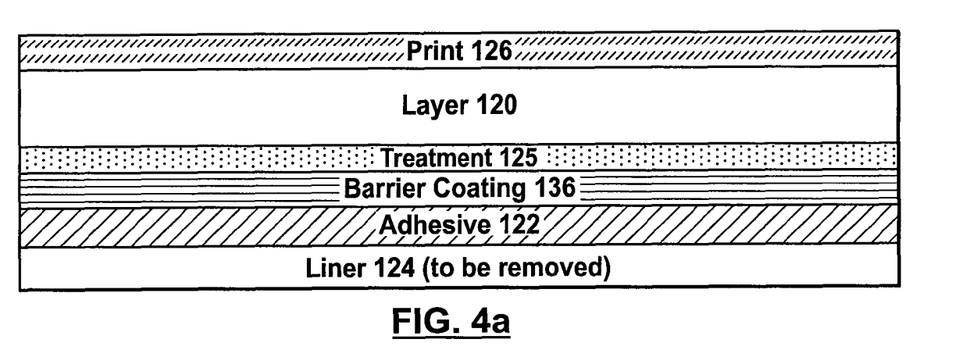
FIGS. 4a, 4b, 4c 4d, 4e, and 4f show embodiments relating to a flexible and resilient film in accordance with the present invention comprising two layers.
Figure 4B:
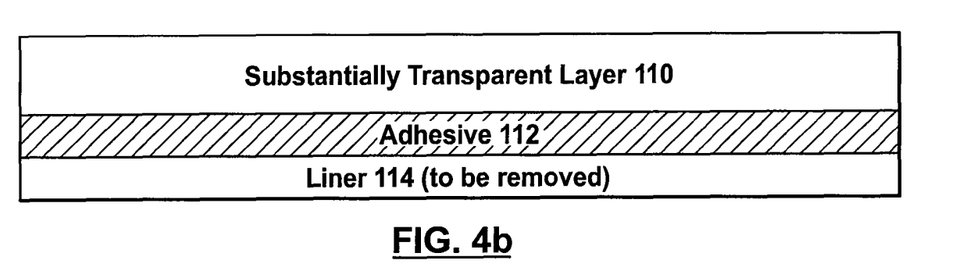
Figure 4C:
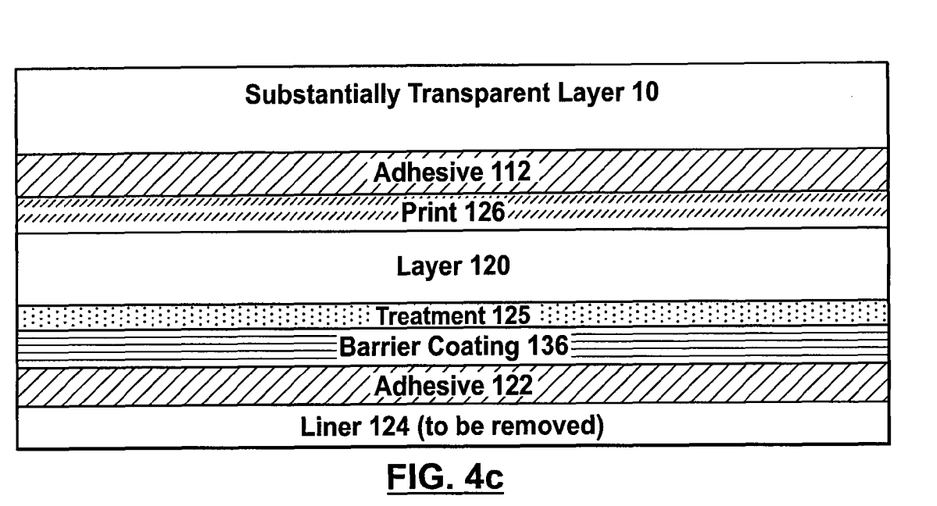
Figure 4D:
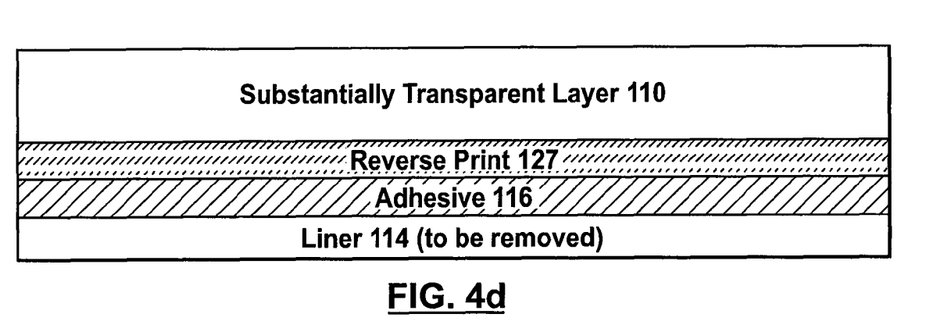

In particular, this embodiment comprises a layer 120 upon which both the barrier coating(s) and the print may be applied. Again, a substantially transparent layer 110 that protects the print may be joined over layer 120. These two layers, joined together, form a complete flexible and resilient film of the present invention.

FIG. 4a shows a layer 120. Layer 120 is an elastomeric film having sufficient resilience to accommodate strains occurring on the surface of the endless moving handrail. Layer 120 may be comprised of thermoplastic polyurethane or another suitably elastomeric material and have the same width and thickness dimensions as discussed above with respect to layer 20.

A barrier coating 136 may be applied on a bottom surface of layer 120, as shown in FIG. 4(a). However, in one embodiment, to improve bonding of the barrier coating 136 to layer 120 a surface treatment process may be optionally undertaken. These surface treatments may include application of a primer and/or one or more of a corona discharge process, a flame treatment process, and a chemical treatment process. These surfaces treatments improve the bonding characteristics of layer 120 and the barrier coating 136, and are shown graphically as element 125 in FIG. 4(a). The barrier coating may have the same width and thickness dimensions as discussed above with respect to barrier coating 36.

An adhesive 122 may be applied to the bottom surface of the barrier coating 136. Examples of appropriate adhesives, include PSAs and other adhesives discussed above. Print 126 may be applied to the top surface of layer 120. A removable liner 124, such as described above, may be applied to the adhesive 122 to prevent the adhesive 122 from causing the layer 120 from adhering to itself or other objects when stored, such as in a rolled condition.

The surface treatments, described above, may enhance the bond of the barrier coating 136 to layer 120, so that when the complete film is removed from a handrail, after its service life, the barrier coating 136 remains adhered to layer 120 and an adhesive 122 remains adhered to the barrier coating 136. Thus a clean removal of the complete film from the handrail surface may be accomplished, which may help to minimize labor costs associated with the film's removal. If the bond of the barrier coating 136 to layer 120 is weak, the barrier coating 136 can separate from layer 120 during removal, and remain adhered to the handrail together with the adhesive 122. This may result in significant additional cost and labor to remove. Though not always necessary, depending upon the formulation of the adhesives and the layers used in the three-layer embodiments described previously such surface treatments may be employed in those embodiments.

Surface treatments may also be applied to the upper surface of layer 120 to enhance the bonding of the print to layer 120. Such surface treatments may include the use of print-receptive coatings, and/or corona discharge, flame treatment, chemical treatment processes. Again, surface treatments can also be employed in the three-layer embodiments discussed above.

FIG. 4b shows a substantially transparent layer 110. The substantially transparent layer 110 may be used as a protective layer applied over layer 120 and used particularly to protect the print 126 from being damaged. The substantially transparent layer 110, such as described above, is sufficiently resilient to accommodate strains occurring on the surface of the endless moving handrail. Adhesive 112, such as PSAs described above, may be applied to the bottom surface of the substantially transparent film. A removable liner 114, such as described above, may be applied to the bottom surface of the substantially transparent layer 110 to prevent the adhesive 112 from causing the substantially transparent layer 110 from adhering to itself or other objects when stored, such as in a rolled condition. The substantially transparent layer 110 may also be tinted.

In one embodiment, to form an elastic and resilient film of the present invention suitable for application to an endless moving handrail, these two separate layers, described above, are laminated together. Liner 114 applied to the substantially transparent layer 110 may be removed, and the adhesive 112 along with substantially transparent layer 110 may be applied to layer 120 covering the print 126, thereby laminating the two layers 110 and 120 together resulting in a two-layer film as shown in FIG. 4c, which is ready to be applied to a handrail.

In another embodiment, the barrier coating 136 may be provided on the top surface of the layer 120. The top surface of the layer 120 may receive a surface treatment, as described above, to promote adhesion of the barrier coating 136. Further, the barrier coating 136 may also receive a surface treatment to promote adhesion of print thereto. In an embodiment where print 126 is to be provided, the print 126 may be applied on a top surface of the barrier coating 136. Alternatively, reverse print 127 may be provided on the bottom surface of the substantially transparent layer 110. The print 126 and the reverse print 127 may include a background color. An adhesive layer 122 may then be provided on the bottom surface of the layer 120. In a further embodiment, the barrier coatings may be provided on both top and bottom surfaces of layer 120. An adhesive may be provided on a bottom surface of the barrier coating on the bottom surface of layer 120.

Alternatively, the two layers 110 and 120 can be individually applied directly to a handrail, layer 120 first, followed by the substantially transparent layer 110. This alternative may be particularly useful in the embodiment shown in FIG. 4d, where the print is shown as reverse print 127 applied to the underside of the substantially transparent layer 110. As described above, this reverse print 127 may be applied to the substantially transparent layer 110 prior to application of the adhesive 116. In one embodiment the adhesive 116 may include a liner 114, which protects the reverse print 127 and adhesive 116. The liner 114 prevents the adhesive 116 from sticking to itself or the substantially transparent layer 110 during storage. The adhesive 116 may be clear, tinted or opaque. Those of skill in the art will appreciate that other adhesives and adhesives not formed on a liner or requiring lamination to the substantially transparent layer may be used with this embodiment.

Figure 4E:
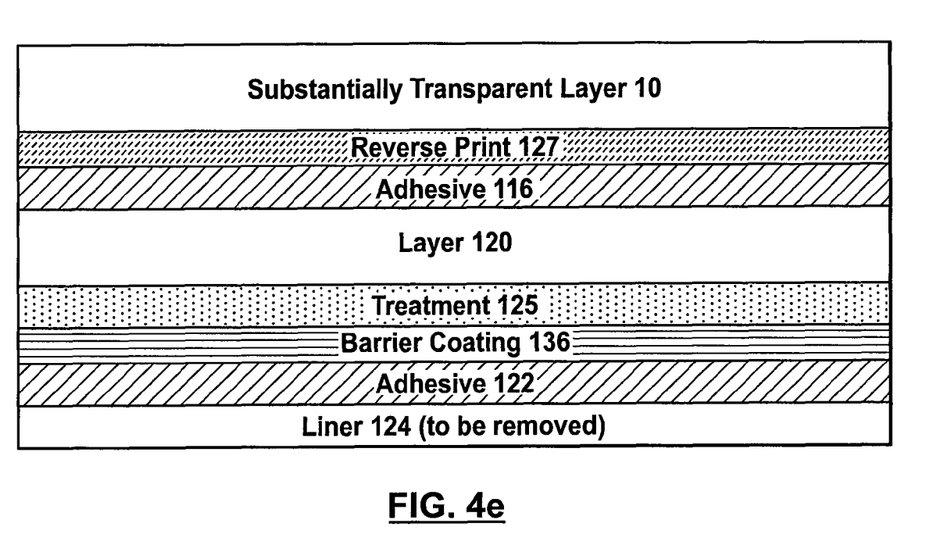

At a desired time this reverse printed upon substantially transparent layer 110 can be joined to a layer 120 to produce a film as shown in FIG. 4e ready to be placed on a handrail. Alternatively, the joining of layer 120 and substantially transparent layer 110 may occur in the field at the handrail itself. As will be appreciated by one of skill in the art, this joining of layers 110 and 120 could also be accomplished through a heat lamination process, which might not include an adhesive 116 on the substantially transparent layer 110.

Figure 4F:
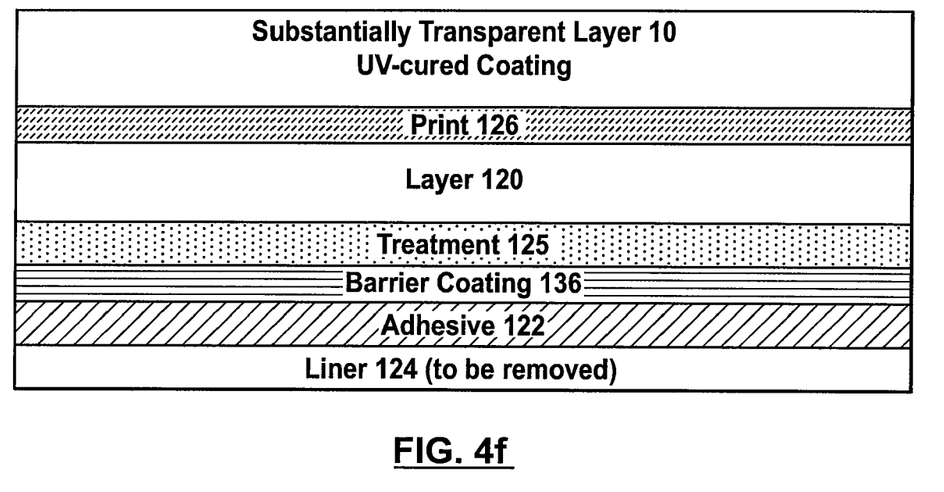

Further, as described with respect to the three-layer embodiments above the substantially transparent layer can be a UV-cured coating as shown in FIG. 4f.

Another aspect of the present invention is that the film may be prestretched prior to lamination and/or prior to application to a handrail, this aspect is also detailed in commonly owned U.S. Pat. No. 7,278,528. Prestretching of the film can be performed, generally in one direction, and typically of the order of five to twelve percent, e.g., a strain would be applied in the longitudinal direction of the film of the order of five to twelve percent. The exact degree of strain will vary depending upon the film, application, handrail configuration, etc. Nonetheless, such a strain must, necessarily, correspondingly elongate print applied to the film. For many images or patterns, this small percentage of elongation in one direction may not have any significant effect and can possibly be overlooked. For other images, to ensure that the image has desired proportions on the film after application, the image would be, correspondingly, shrunk or reduced in the axial direction, then, when extended, it will be returned to its original, intended length. The axial stretching should have little or no effect on the transverse dimension of an image, although it is known that elongation in one direction can cause a reduction in the corresponding perpendicular dimension, and this can be compensated for where it occurs.

Another aspect of the prestretch is that the degree of prestretch, measured as a strain or percentage elongation of the film, is preferably at least greater than the maximum degree of compressive reduction in length of the film, i.e. negative elongation, that could occur in use, as the moving handrail travels along its path during use. This will then ensure that, all portions of the film, even when the handrail is flexed, will always be maintained in tension. The handrail itself, particularly towards the lips may be subjected to significant compressive strains, but the net strain in the film will always be a tensile strain. Consequently, there should be no tendency for the film to lift from the handrail.

While such prestretching of the film will increase the total tensile load applied to the top portion of the film on top of the handrail, as this is only the relatively short distance from the neutral axis, the total tensile strain applied to the film should still be acceptable. For certain handrail designs, configurations and selection of materials for film, this may result in excessive tensile loads being applied to the film. In such cases, it may be possible to reduce the prestretch applied to the film, so that, for the edges of the film, small, compressive strains may be applied. These should be selected to be so small that they can be readily borne by the adhesive used to adhere the film to handrail without causing any significant wrinkling or puckering to occur.

A variety of techniques can be used to apply the barrier coating to the individual films. One technique is to use roll coating to apply the coating, which are in a liquid form and then a doctor knife or the like to remove excess material.

Figure 5:
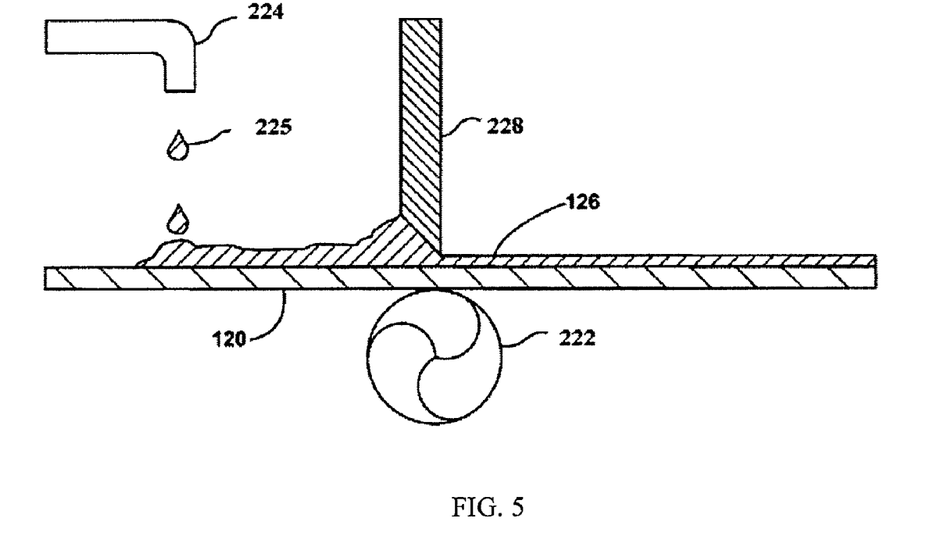
FIG. 5 is a schematic diagram showing a knife-over-roll technique for applying a coating in accordance with an embodiment of the present invention.

Such a scheme is shown schematically in FIG. 5. In FIG. 5, a layer, such as layer 30 or 120 discussed above, is indicated at 120, and is shown passing over a roller 222. A dispensing nozzle or the like 224 dispenses the coating compound 225 onto the top of the layer 120.

A blade or knife 228 may be used to control the thickness of the film so that there is a uniform locating 126 on top of the film 120, as the film travels to the right in FIG. 5.

It should be noted that the use of this technique, has the effect of ensuring that the overall thickness of the film and the coating is uniform. This is sometimes referred to as a "post-metered" technique. A post-metered technique can also be effected by using a wire rod or an air knife, or the like.

FIGS. 6a through 6d also show schematically the progressive application of a coating using a knife over role technique. This is similar to the technique shown in FIG. 5. Here, a reservoir 140 contains a supply 142 of the coating material and is located above a roller 144. A film layer 146 passes between the reservoir 140 and the roller 144.

Figure 6A:
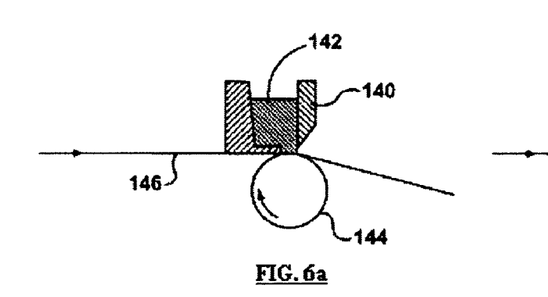
FIGS. 6a through 6d are further schematic drawings of the knife-over-roll technique in accordance with an embodiment of the present invention.
Figure 6B:
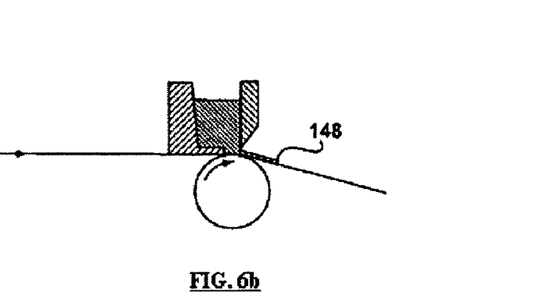
Figure 6C:
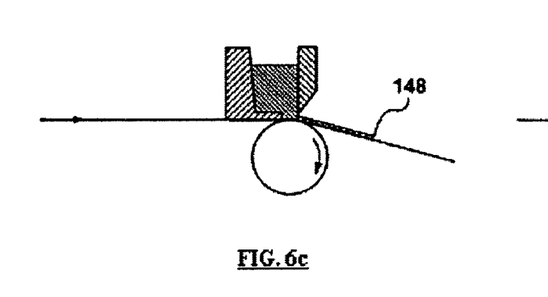
Figure 6D:
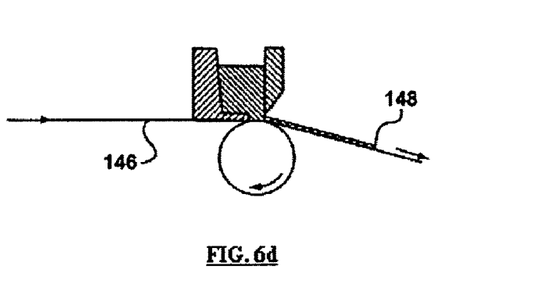

FIG. 6a shows this process at the commencement of the coating process. As shown in FIG. 6b through 6d, a coating 148 progressively extends along the film layer 146 as the film layer 146 passes between the reservoir 142 and over the roller 144

Other coating techniques have the effect of ensuring that the thickness of the coating itself is uniform, if there are any irregularities in the thickness of the underlying substrate. Such a technique is referred to as "pre-metered". In the present case, the underlying substrate is the film layer itself, which is expected to be of substantially constant and uniform thickness. Practically, therefore, it is expected that differences between a post-metered and a pre-metered technique may be slight, but will depend upon the material and quality of the individual film layer.

Pre-metered techniques that provide a uniform coating thickness include among others direct gravure, reverse gravure, offset gravure, reverse roll and slot die. All of these and other techniques such as spray coating, use of slot die coaters to name a few may be applicable for the present invention.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

The invention claimed is:

1. A method of applying a film to an endless moving handrail comprising the steps of:
    adhering a first film layer, the first film layer including a barrier coating on at least one of top and bottom surfaces of the first film layer, to a surface of the endless moving handrail; and
    adhering a substantially transparent film layer over the first film layer,
    wherein the barrier coating includes nano-clay dispersed in an elastomeric material,
    wherein the barrier coating substantially retards the transmission of staining chemicals blooming from the surface of the endless moving handrail,
    wherein the elastomeric material is selected from one of neoprene, nitrile rubber, and butyl rubber, and
    wherein the first film layer, the barrier coating and the transparent film layer have sufficient resilience to accommodate strains occurring on the surface of the endless moving handrail.

2. The method of claim 1, wherein the first film layer comprises one of: print applied to the top surface of the first film layer and the barrier coating provided on the bottom surface of the first film layer; and the barrier coating provided on the top surface of the first film layer and print applied onto the barrier coating.

3. The method of claim 1, wherein the substantially transparent film layer includes reverse print on a bottom surface thereof.

4. The method of claim 3, wherein the substantially transparent film layer includes an adhesive adhered to a bottom surface thereof and covering the reverse print.

5. The method of claim 1, wherein the adhering of the substantially transparent film layer over the first film layer occurs prior to the adhering of the first film layer to the handrail.

6. The method of claim 1, wherein the adhering of the substantially transparent film over the first film layer occurs after the adhering of the first film layer to the handrail.

7. A method of applying a film to an endless moving handrail comprising the steps of:
    adhering a first film layer, having sufficient resilience to accommodate strains occurring on a surface of the endless moving handrail and including a barrier coating on a top surface of the first film layer, to the surface of the endless moving handrail;
    adhering a second film layer to a top surface of the barrier coating, the second film layer having sufficient resilience to accommodate strains occurring on the surface of the endless moving handrail; and
    adhering a substantially transparent film layer over the second film layer,
    wherein the barrier coating includes nano-clay dispersed in an elastomeric material,
    wherein the barrier coating substantially retards the transmission of staining chemicals blooming from the surface of the endless moving handrail, and
    wherein the elastomeric material is selected from one of neoprene, nitrile rubber, and butyl rubber.

8. The method of claim 7, wherein the second film layer includes print applied to a top surface thereof.

9. The method of claim 7, wherein the substantially transparent film layer includes reverse print applied to a bottom surface thereof.

10. The method of claim 9, wherein the substantially transparent film layer includes an adhesive adhered to a bottom surface thereof and covering the reverse print.

11. The method of claim 8, wherein second film layer and the substantially transparent film layer are adhered together first and subsequently adhered to the first film layer previously adhered to the endless moving handrail.

12. The method of claim 8, wherein the first film layer and second film layer are adhered together to form a combination prior to adhering the combination to the endless moving handrail.

13. The method of claim 12, wherein the adhering of the substantially transparent film layer onto the second film layer occurs after the adherence of the combination to the handrail.

14. The method of claim 10, wherein the second film layer and the substantially transparent film layer with reverse print are adhered together first and subsequently adhered to the first film layer previously adhered to the endless moving handrail.

15. The method of claim 10, wherein the first film layer and the second film layer are adhered together to form a combination prior to adhering the combination to the endless moving handrail.

16. The method of claim 15, wherein the adhering of the substantially transparent film layer with reverse print onto the second film layer occurs after the adherence of the combination to the handrail.

17. The method of claim 7, wherein the first film layer has a barrier coating on both the top surface and a bottom surface.

18. A method of applying a film to an endless moving handrail comprising the steps of:
adhering a first film layer, the first film layer including a barrier coating on at least one of top and bottom surfaces of the first film layer, to a surface of the endless moving handrail, wherein the first film layer and the barrier coating have sufficient resilience to accommodate strains occurring on the surface of the endless moving handrail, wherein the barrier coating substantially retards the transmission of staining chemicals blooming from the surface of the endless moving handrail, wherein the barrier coating includes nano-clay dispersed in an elastomeric material, and wherein the elastomeric material is selected from one of neoprene, nitrile rubber, and butyl rubber; and
adhering a substantially transparent film layer over the first film layer, the transparent film layer having sufficient resilience to accommodate strains occurring on the surface of the endless moving handrail.

19. The method as claimed in claim 18, wherein the barrier coating is of thickness in the range of 7.5-52.5 microns.

20. The method as claimed in claim 18, wherein the barrier coating is of thickness in the range of 20-25 microns.

21. The method as claimed in claim 1, wherein the elastomeric material is butyl rubber.

22. The method as claimed in claim 7, wherein the elastomeric material is butyl rubber.

23. The method as claimed in claim 18, wherein the elastomeric material is butyl rubber.

* * * * *